United States Patent [19]

Cowan et al.

[11] Patent Number: 4,956,104

[45] Date of Patent: Sep. 11, 1990

[54] ORGANOPHILIC POLYMERS

[75] Inventors: Jack C. Cowan, Lafayette, La.; Roy F. House, Houston, Tex.; Victor M. Granquist, Beaufort, S.C.

[73] Assignee: Venture Chemicals, Inc., Lafayette, La.

[21] Appl. No.: 360,020

[22] Filed: Jun. 1, 1989

Related U.S. Application Data

[60] Division of Ser. No. 161,478, Feb. 29, 1988, Pat. No. 4,863,980, which is a continuation-in-part of Ser. No. 887,360, Jul. 21, 1986, Pat. No. 4,737,295.

[51] Int. Cl.$^5$ .............................................. C09K 7/06
[52] U.S. Cl. ............................. 252/8.551; 252/8.511; 252/8.514; 252/8.515; 536/56
[58] Field of Search ............... 252/8.511, 8.514, 8.551, 252/8.515

[56] References Cited

U.S. PATENT DOCUMENTS

| | | | |
|---|---|---|---|
| 3,168,475 | 2/1965 | Jordan et al. | 252/8.514 |
| 4,421,655 | 12/1983 | Cowan | 252/8.515 |
| 4,571,422 | 2/1986 | Symes et al. | 536/114 X |
| 4,597,878 | 7/1986 | House et al. | 252/8.5 |
| 4,728,444 | 3/1988 | Clapper et al. | 252/8.511 |
| 4,735,732 | 4/1988 | Clapper et al. | 252/8.511 |

Primary Examiner—John S. Maples
Assistant Examiner—Chhaya Sayala
Attorney, Agent, or Firm—Roy F. House

[57] ABSTRACT

Organophilic polymer adducts which are effective fluid loss control additives for oil base well-working fluids are prepared from an anionic or cationic water soluble polymer and one or more phosphatides. Preferred phosphatides are phosphoglycerides obtained from vegetable oils, most preferably commercial lecithin. Preferred polymers comprise polysaccharides or derivatives thereof and synthetic polymers.

6 Claims, No Drawings

ORGANOPHILIC POLYMERS

This is a divisional patent application of co-pending patent application Ser. No. 161,478 filed Feb. 29, 1988, now U.S. Pat. No. 4,863,980, which is a continuation-in-part of U.S. patent application Ser. No. 887,360 filed July 21, 1986, now U.S. Pat. No. 4,737,295.

FIELD OF THE INVENTION

The invention relates to organophilic derivatives of polymers, to methods for their manufacture, and to their use in oil base well working fluids.

BACKGROUND OF THE INVENTION

In the drilling of wells for oil and gas by the rotary method, it is common to use a circulating fluid which is pumped down to the bottom of the well through a drill pipe, where the fluid emerges through ports in the drilling bit. The fluid rises to the surface in the annular space between the drill pipe and the walls of the hole, and at the surface it is treated to remove cuttings and the like to prepare it for recirculation into the drill pipe. The circulation is substantially continuous while the drill pipe is rotated.

The present invention pertains to oil base drilling fluids or oil base muds which includes water-in-oil (invert) emulsions as well as oil base fluids containing only small amounts or no emulsified water.

An important feature of well working fluids of the class described is their ability to resist filtration. In most instances, when they are in actual use, whether as drilling fluids, packer fluids, fracturing or completion fluids, the well working fluid is in contact with a more or less permeable formation, such as, for example, sandstone, sandy shale and the like, with an effective balance of pressure such that the fluid tends to be forced into the permeable formation. When a well working fluid is deficient in its ability to resist filtration, then the solids in the fluid are held back by the permeable formation and build up as a filter cake or sludge on its surfaces, while the liquid per se of the well working fluid filters into the permeable formation. The filter cake or sludge thus formed is generally very undesirable. Moreover, the loss of oil to the formation is very expensive, not only because of the cost of the oil itself, but also due to the cost of maintaining the properties and composition of the fluid.

Various additives have been used or suggested for use as fluid loss additives to prevent or decrease this loss of fluid by filtration from oil base muds. Some of the first materials used for this purpose were asphalt and various modified asphaltic materials. The following patents disclose various amine derivatives of various polyphenolic compounds for use as fluid loss control additives (hereinafter sometimes referred to as FLCA) for oil muds: Jordan et al. U.S. Pat. No. 3,168,475; Jordan et al. U.S. Pat. No. 3,281,458; Beasley et al. U.S. Pat. No. 3,379,650; Cowan et al. U.S. Pat. No. 3,232,870; Cowan et al. U.S. Pat. No. 3,425,953; Andrews et al. U.S. Pat. No. 3,494,865; Andrews et al. U.S. Pat. No. 3,671,427, Andrews et al. U.S. Pat. No. 3,775,447; Kim U.S. Pat. No. 3,538,071; Kim U.S. Pat. No. 3,671,428; Cowan U.S. Pat. No. 4,421,655; Connell et al. U.S. Pat. No. 4,501,672; and Frost European Patent Application No. 049,484.

As noted in the examples in the aforementioned patents, the amount of the organic amine or amide compounds reacted with the polymeric phenolic compounds disclosed is quite high, generally of the order of 75%–100% or more, based on the weight of the polymeric phenolic compound, although amounts from 20% to 200% are disclosed to be useful. Most of these FLCA possess poor dispersibility in well working fluids unless elaborate procedures are undertaken, such as the addition of a dispersant, heating, agitating under high shear or for extended periods of time, drying under low temperature conditions, flushing, preparation in oleaginous liquids, and the like. Moreover, the amine and amide compounds are relatively expensive to prepare and/or purchase, and thus these FLCA are quite expensive to produce.

SUMMARY OF THE INVENTION

We have now found that organophilic derivatives of water soluble polymers can be prepared by reaction of the polymer with a phosphatide, preferably commercial lecithin. These phosphatide/polymer adducts are organophilic, and have been found to be fluid loss additives for oil based well working fluids.

PREFERRED EMBODIMENTS OF THE INVENTION

The novel FLCA of this invention comprises an organophilic material which is a phosphatide derivative of a water soluble polymer.

The organophilic phosphatide which is useful in the practice of the invention is one or more phosphatides having the empirical formula

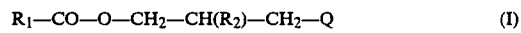

$$R_1-CO-O-CH_2-CH(R_2)-CH_2-Q \qquad (I)$$

where $R_1$ is an aliphatic group containing from 8 to 29 carbon atoms; $R_2$ is selected from the group consisting of H, OH, $R_1COO$, and $OP(O)(O^-zM^{a+})OZ$; Q is selected from the group consisting of $R_1COO$, and $OP(O)(O^-zM^{a+})OZ$; Z is selected from the group consisting of $xM^{a+}$, $C_6H_6(OH)_5$ and $CH_2-CH(Y)-N(R_3)(R_4)(R_5)_y(A^{b-})_v$; Y is selected from the group consisting of H and $COO(wM^{a+})$; $R_3$, $R_4$, and $R_5$ are independently selected from the group consisting of H, aliphatic groups containing from 1 to 30 carbon atoms, and $R_6CO$; $R_6$ is an aliphatic group containing from 1 to 29 carbon atoms; M is a cation selected from the group consisting of H, an alkali metal, an alkaline earth metal, ammonium, and mixtures thereof; A is an anion of valence b; y=0 or 1; w, x, and z=0 or 1/a where a is the valence of M; v=0 or 1/b; and where Q is $R_1COO$ only when $R_2$ is $OP(O)(O^-zM^{a+})OZ$.

Preferably $R_1$ contains from about 15 to about 17 carbon atoms, $R_2$ is selected from the group consisting of $R_1COO$ and $OP(O)(O^-zM^{a+})OZ$; and $R_3$, $R_4$, and $R_5$ are independently selected from the group consisting of H, $CH_3$, and $R_1CO$.

Such phosphatides are present in amounts up to about 5% by weight in certain crude vegetable oils, which are principally triglycerides of formula (I) wherein both $R_2$ and Q are $R_1COO$ where $R_1$ is an aliphatic group containing from about 15 to about 17 carbon atoms. Various refining procedures, well known in the art, may be utilized to isolate the various individual phosphatides or to concentrate the phosphatides as a group (mixture of phosphatides). Thus crude commercial lecithin from soybean oil contains from about 30% to about 50% by weight triglyceride and from about 50% to about 70% by weight of a mixture of phosphatides, principally phosphatidyl choline (α-form and β-form), phosphatidyl ethanolamine (α-form and β-form), N-Acyl phosphatidyl ethanolamine (α-form and β-form), phosphatidyl serine (α-form and β-form), phosphatidyl inositol (α-form and β-form), phosphatidic acid, minor amounts of various other phosphatides, or the alkali metal or alkaline earth metal salts thereof. In the α-form the phosphate ester group $OP(O)(O^-zM^{a+})OZ$ is on the end carbon (Q) whereas in the β-form the phosphate ester group is on the middle carbon atom ($R_2$ group).

Thus preferably the organophilic phosphatide is a mixture of phosphatides having the empirical formula $$R_1COO-CH_2-CH(R_2)-CH_2-Q \quad (II)$$

where $R_1$ is an aliphatic group containing from about 15 to about 17 carbon atoms; $R_2 = c\ R_1COO + d\ OP(O)(O^-zM^{a+})OZ$; $Q = d\ R_1COO + c\ OP(O)(O^-zM^{a+})OZ$; Zi is selected from the group consisting of $xM^{a+}$, $C_6H_6(OH)_5$ and $CH_2-CH(Y)-N(R_3)(R_4)(R_5)_y(A^{b-})_v$; Y is selected from the group consisting of H and $COO(wM^{a+})$; $R_3$, $R_4$, and $R_5$ are independently selected from the group consisting of H, $CH_3$, and $R_1CO$; M is a cation selected from the group consisting of H, an alkali metal, an alkaline earth metal, ammonium, and mixtures thereof; y = 0 or 1; A is an anion of valence b; w, x, and z = 0 or 1/a where a is the valence of M; v = 0 or 1/b; c ≥ 0; d ≥ 0; and c + d = 1.

Such phosphatides wherein: $Z = CH_2CH_2N(CH_3)_3$ are called phosphatidyl choline (or lecithin); $Z = CH_2CH_2NH_3$ or $CH_2CH_2NH_2$ are called phosphatidyl ethanolamine (or cephalin); $Z = CH_2CH(COO^-)NH_3$ or $CH_2CH(COOH)NH_2$ are called phosphatidyl serine; $Z = CH_2CH_2NH-CO-R_1$ are called N-Acylphosphatidyl ethanolamine; $Z = C_6H_6(OH)_5$ are called phosphatidyl inositol; and $Z = H$ are called phosphatidic acid. The amounts of these phosphatides which are present in the phosphatide mixture of various vegetable oils have been variously disclosed to be as follows:

| Phosphatide | % Phosphatide, Based on the Weight of all Phosphatides, in | | | |
|---|---|---|---|---|
| | Soybean Oil | Corn Oil | Cottonseed Oil | Sunflower Oil |
| Choline | 28–32 | 41–46 | 0–33 | 52 |
| ethanolamine | 12–31 | 4–5 | 19–39 | 20 |
| inositol | 20–32 | 19–23 | 6–37 | 26 |
| serine | — | 0–3 | 0–33 | — |
| acid | — | 14–16 | — | 2 |
| other | 15–18 | 12–16 | 8–25 | — |

Thus a preferred phosphatide mixture suitable for use in this invention contains from about 0% to about 52% phosphatidyl choline, from about 4% to about 39% phosphatidyl ethanolamine, from about 6% to about 37% phosphatidyl inositol, from about 0% to about 33% phosphatidyl serine, from about 0% to about 16% phosphatidic acid, and from about 0% to about 25% of various other phosphatides. The most preferred phosphatide mixture is commercial soybean lecithin.

The organophilic modifier useful in this invention preferably contains from about 50% to about 100% by weight of organophilic phosphatides and from about 0% to about 50% by weight of a vegetable oil triglyceride. Most preferably the organophilic modifier is commercial lecithin which contains from about 30% to about 50% of the vegetable oil from which the lecithin is concentrated, from about 35% to about 70% of a mixture of phosphatides having the empirical formula $$R_1-CO-O-CH_2-CH(R_2)-CH_2-Q \quad (III)$$

where: $R_1$ is an aliphatic group containing from about 15 to about 17 atoms; $R_2$ is selected from the group consisting of $R_1COO$ and $OP(O)(O^-zM^{a+})OZ$; Q is selected from the group consisting of $R_1COO$ and $OP(O)(O^-zM^{a+})OZ$; Z is selected from the group consisting of $xM^{a+}$, $C_6H_6(OH)_5$, and $CH_2-CH(Y)-N(R_3)(R_4)(R_5)_y(A^{b-})_v$; Y is selected from the group consisting of H and $COO(wM^a)$; $R_3$, $R_4$, and $R_5$ independently selected from the group consisting of H, $CH_3$, and $R_1CO$; M is a cation selected from the group consisting of H, an alkali metal, an alkaline earth metal, ammonium, and mixtures thereof; A is an anion of valence b; y = 0 or 1; w, x and z = 0 or 1/a where a is the valence of M; v = 0 or 1/b; and Q is $R_1COO$ only when $R_2$ is $OP(O)(O^-zM^{a+})OZ$; and from 0% to about 18% of other phosphatides.

While the ammonium-containing phosphatides may be in the internally neutralized zwitterionic form (i.e., v = 0, y = 1, and either w = 0 or z = 0), it is believed that such phosphatides react with the polymers by substitution because of the insolubility of the resulting organophalic polymer adduct. Regardless of the mechanism of the formation of the organophilic polymeric material, there is formed a phosphatide-polymer adduct which is an effective fluid loss additive for oil base well working fluids.

The water soluble polymers which may be modified in accordance with this invention include polysaccharides or polysaccharide derivatives and synthetic polymers. The term "polysaccharide or polysaccharide derivative" is used conventionally herein and refers generally to polysaccharides (i.e., polymers comprised of monosaccharide units linked together by glycosidic bonds) or chemical modifications of polysaccharides which polysaccharides or chemical modifications thereof are soluble in one or more aqueous liquids. By the term "water soluble" is meant that the polymer is capable of being admixed with water under appropriate temperature and pH conditions such that the resulting mixture appears as a homogeneous liquid under visual inspection with no magnification. Thus, water soluble polymers may form true solutions in water, colloidal dispersions in water, or emulsions in water.

Polymers which are suitable for use in accordance with the present invention are either anionic or cationic. Anionic polymers will contain, in sufficient concentration and reactive position, one or more of the functional groups carboxyl, sulfate, or sulfonate. Cationic polymers will contain, in sufficient concentration and reactive position, one or more of the functional groups amine, quaternary ammonium, or quaternary phosphonium.

Particularly suitable polymers are polysaccharides which contain one or more of the following monosaccharide units: arabinose, fructose, galactose, galactopyranosyl, galacturonic acid, guluronic acid, glucuronic acid, glucose, glucoside, N-acetylglucosamine, mannuronic acid, mannose, pyranosyl sulfate, rhamnose, or xylose. Polysaccharides containing the foregoing units include alginic acid, agar, carrageean, cellulose, chitin, guar gum, gum arabic, gum ghatti, gum karaya, gum konjak, gum tamarind, gum tara, gum tragacanth, locust bean gum, pectins, starch, and xanthan gum. Polysaccharides which are either anionic or cationic include the natural polysaccharides alginic acid, carrageenan, chitosan (partially deacetylated chitin), gum arabic, gum ghatti, gum karaya, gun tragacanth, pectins, and xanthan gum, and derivatives of all of the polysaccharides listed in the preceeding sentence containing one or more of the functional groups carboxyl, sulfate, sulfonate, amine, quaternary ammonium, or quaternary phosphonium. Derivatization of polysaccharides to incorporate the desired functional group therein is well known in the art and reference is made thereto for the purposes of this invention.

Thus representative polysaccharide derivatives include carboxymethyl ethers, carboxyethyl ethers, sulfate esters, methylsulfonic acid ethers, dialkylaminoalkyl ethers, dialkylphosphonoalkyl ethers, dialkylaminoalkyl ethers quaternized with dimethyl sulfate or methyl chloride, hydroxyalkyl (i.e. hydroxyethyl and hydroxypropyl) carboxyalkyl ethers, hydroxyalkyl ether sulfate esters, hydroxyalkyl methylsulfonic acid ethers, hydroxyalkyl dialkylaminoalkyl ethers, hydroxyalkyl dialkylphosphonoalkyl ethers, hydroxyalkyl dialkylaminoethyl ethers quaternized with dimethyl sulfate or methyl chloride, and grafted polysaccharide polymers containing one or more unsaturated monomers grafted onto the polysaccharide. Representative of such monomers include acrylamide, methacrylamide, acrylic acid, methacrylic acid, aminoalkylacrylates, aminoalkylmethacrylates, dialkylaminoalkyl acrylates, dialkylaminoalkyl methacrylates, vinyl sulfonate, vinyl benzyl dimethyl ammonium chloride, 2-sulfoethylacrylate, vinyl benzyl sulfonates, 2-acrylamido-2-methylpropane sulfonic acid, quaternized salts of the amino-containing monomers with dimethyl sulfate or methyl chloride, and the like.

The solubility of the aforementioned polysaccharides and derivatives thereof is dependent upon a variety of factors including the average degree of polymerization and, in the case of polysaccharide derivatives, the particular substituent and the degree of substitution, i.e., the number of substituent groups per anhydroglucose unit of the polysaccharide molecule. In general, the relative solubility of the polysaccharide in an aqueous liquid increases as the molecular weight decreases. Additionally, a polysaccharide derivative having a low degree of substitution may only be soluble in alkaline aqueous liquid, whereas a polysaccharide derivative having a higher degree of substitution may be soluble in water as well as an alkaline aqueous liquid. The particular substituent and the degree of substitution which imparts the desired solubility to the polysaccharide derivatives are well known in the art and reference is made thereto for the purposes of this invention.

Anionic and cationic synthetic water soluble polymers may also be modified in accordance with this invention.

Anionic polymers can be prepared by reacting under polymerizing conditions ethylenically unsaturated acid(s) with nonionic ethylenically unsaturated monomers. Cationic polymers can be prepared by reacting under polymerizing conditions ethylenically unsaturated amino or ammonium monomer(s) with non-ionic ethylenically unsaturated monomers.

The ethylenically unsaturated acid is used to introduce an acidic group into the resulting copolymer. It includes compounds having at least one, preferably only one, radical-polymerizable ethylenically unsaturated bond ($>C=C<$) and at least one, preferably 1 or 2, acid functional groups such as carboxyl or sulfo groups, per molecule. Preferred examples are compounds of the following general formula

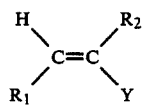

(I)

wherein $R_1$ represents a hydrogen atom, a lower alkyl group or a carboxyl group, $R_2$ represents a hydrogen atom, a lower alkyl group or a carboxymethyl group, and Y represents a carboxyl group, a sulfo group, a sulfomethyl group ($-CH_2SO_3H$) or a sulfophenyl group

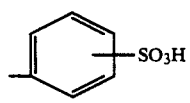

Specific examples of the ethylenically unsaturated acid include ethylenically unsaturated monocarboxylic acids having 3 to 10 carbon atoms, such as acrylic acid, methacrylic acid and crotonic acid; ethylenically unsaturated dicarboxylic acids having 4 to 12 carbon atoms, such as maleic acid, fumaric acid, an itaconic acid, or their monoalkyl ($C_{1-8}$) esters; and ethylenically unsaturated monosulfonic acids such as allylsulfonic acid, styrenesulfonic acid and a-methylstyrenesulfonic acid. Acrylic acid and methacrylic acid are especially preferred.

The term "lower", as used in the present specification and the appended claims, means that groups or compounds qualified by this term have not more than 6, preferably not more than 4, carbon atoms.

These ethylenically unsaturated acids can be used either singly or in combination.

The ethylenically unsaturated amino or ammonium monomer is used to introduce a cationic group into the resulting copolymer.

Useful water soluble cationic vinyl monomers include (1) N-substituted (N'-dialkylaminoalkyl) acrylamides such as:
N-(diethylaminomethyl)acrylamide,
N-(diethylaminomethyl)methacrylamide,
N-(dimethylaminomethyl)acrylamide,
N-(dipropylaminomethyl)acrylamide,
N-(piperidylmethyl)acrylamide:

(2) Aminoalkylacrylates and dialkylaminoalkylacrylates such as:
Diethylaminopropylacrylate,
Dimethylaminoethylacrylate,
Dimethylaminopropylacrylate;

(3) Vinylpyridine;

(4) Diallylamines such as:
Diallylbenzylamine,
Diallylmethylamine,
Diallylethylamine, (5) Quaternaries such as:
Acrylamidopropylbenzyldimethylammonium hydroxides,
N-methyl-vinylpyridinium chloride,
Diallyldimethylammonium chloride,
Diallyldiethylammonium chloride,
Acrylopropylbenzyldimethylammonium hydroxide.

Quaternaries having at least one ethylenically unsaturated substituent may also be prepared using members of groups (1), (2), (3), (4) and the like.

The non-ionic ethylenically unsaturated monomer which can be copolymerized with the ethylenically unsaturated acid or the ethylenically unsaturated amino or ammonium monomer includes aliphatic, cyclic, or heterocyclic compounds, or mixtures thereof, which contain at least 1, preferably 1 or 2, radical polymerizable ethylenically unsaturated bonds per molecule and usually 2 to 26, preferably 3 to 21, carbon atoms and have a relatively low molecular weight. Specific examples are given below.

(A) Acrylic or methacrylic acid esters $C_{1-18}$ alkyl or cycloalkyl esters of acrylic or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and cyclohexyl methacrylate; $C_{2-12}$ alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_{2-8}$ hydroxyalkyl esters of acrylic or methacrylic acid such as hydroxyethyl acrylate, hydroxyethyl methacrylate, hydroxyethyl methacrylate, hydroxypropyl acrylate and hydroxypropyl methacrylate; monoesters of acrylic or methacrylic acid with (poly) $C_{1-12}$ alkylene glycols, such as ethylene glycol, polyethylene glycol, propylene glycol, polypropylene glycol or butylene glycol, or their $C_{1-12}$ alkyl ethers; glycidyl acrylate, glycidyl methacrylate or adducts formed between glycidyl acrylate or methacrylate with $C_{2-18}$ saturated or unsaturated monocarboxylic acids (e.g., acetic acid, propionic acid, stearic acid, linoleic acid, lauric acid, oleic acid, or linolenic acid); and condensation products formed between $C_{2-18}$ saturated or unsaturated monocarboxylic acids and $C_{1-4}$ hydroxyalkyl esters of acrylic or methacrylic acid such as hydroxyethyl methacrylate, hydroxyethyl acrylate, hydroxypropyl acrylate or hydroxypropyl methacrylate.

(B) Vinyl aromatic compounds

Styrene, -methylstyrene, vinyltoluene, p-chlorostyrene, and vinylpyridine.

(C) Diolefinic compounds

Diolefins having 4 to 5 carbon atoms, such as butadiene, isoprene, and chloroprene.

(D) Monolefinic compounds $C_{2-8}$ monolefins such as ethylene, propylene and butene.

(E) Acrylic or methacrylic amide

Acrylamide, methacrylamide, N-methylol acrylamide, and N-butoxymethyl acrylamide.

(F) Ethylenically unsaturated nitriles Acrylonitrile and methacrylonitrile (G) Vinyl esters of carboxylic acids Vinyl acetate, vinyl propionate, and Veova monomer (a trademark for a product of Shell Chemical Co.).

(H) Other ethylenically unsaturated monomers

Methylisopropenyl ketone, vinyl chloride, vinylidene chloride, and di($C_{1-8}$ alkyl) esters of maleic acid.

Among these ethylenically unsaturated monomers, acrylic or methacrylic acid esters are especially preferred for use in this invention.

The above non-ionic ethylenically unsaturated monomers may be used singly or in a combination of two or more.

Generally speaking, the organophilic polymers of this invention may be produced by bringing together the water soluble polymer in either acid or base form and the phosphatide in its base or acid form, respectively. The basic groups and the acidic groups are believed to neutralize each other with salt formation and the large organophilic portion of the phosphatide and any organophilic carrier such as vegetable oil triglycerides are sorbed onto the surface of the polymeric material to form the organophilic polymer material. The polymer may be converted to a water soluble or colloidally dispersible salt by reaction with a suitable base, generally an alkali metal, alkaline earth metal, or ammonium base, most preferably an alkali metal base such as sodium hydroxide, potassium hydroxide, and the like, or a basic salt such as an alkali metal borate, carbonate, and the like salts as is well known in the art. The phosphatide is then caused to be present in the form of a simple salt. Thus the amine groups in the phosphatide may be reacted with an acid such as hydrochloric, acetic, phosphoric, sulfuric and the like to give the corresponding ammonium salt.

For the preparation of solid, particulate organophilic polymer adducts of this invention, it is generally sufficient to insure intimate contact of the polymer and the phosphatide. Generally intensive mixing is sufficient for reaction. Suitable intensive mixers which are capable of handling semi-solid materials are pug mills, extruders, ribbon blenders, Littleford Bros. mixer, Martin mixer, and the like apparatus. Water contents less than about 60% by weight of the organophilic polyphenolic adduct will generally produce a semi-solid material. Thereafter the organophilic polyphenolic adduct is preferably dried to less than about 20% water and ground to produce a free-flowing powder. Alternatively, higher water contents generally produce slurries of the organophilic polyphenolic adduct from which the adduct may be recovered by spray drying, filtration, and the like known processes.

In a preferred slurry process, the polymer is dispersed in hot water with an alkali metal base to form a basic solution, suspension, or emulsion, the phosphatide added, and at least sufficient acid added to neutralize the alkali metal base.

The organophilic polymer materials can be prepared in the presence of an organic liquid rather than an aqueous liquid. Thus the polymer and the phosphatide can be reacted together such as by high shear mixing at temperatures uP to the boiling point of the mixture in various organic liquids, such as petroleum oils or refined fractions thereof, generally paraffinic, aromatic, and naphthenic hydrocarbons of various molecular weights, or mixtures thereof. In this process the phosphatide can be caused to be present in an amount in excess of the amount required to form the organophilic polymer adduct. There is thus obtained a mixture of the organophilic polymer adduct and the phosphatide in the organic liquid. Such a mixture can be used as a combination additive in oil base drilling fluids to decrease the fluid loss and decrease the tendency of inert solids in the drilling fluid to water wet.

The minimum amount of phosphatide reacted with the polymer need only be sufficient to render the polymer organophilic. For the purposes of this invention, the polymer is considered organophilic when it is wetted by the organic liquid when admixed with a mixture of water and an insoluble organic liquid. Generally depending upon the particular polymer and its method of preparation, the minimum amount of phosphatide will be about 2.5% by weight based on the weight of the polymer. The maximum amount of phosphatide reacted with the polymer is limited by the method of preparation and the characteristics of the polyphenolic material since concentrations of phosphatides in excess of that required to react by charge neutralization and surface adsorption provide enhanced organophilic properties. Thus when utilizing a high shear, semi-solid process as disclosed hereinbefore, the maximum amount of phosphatide which may be caused to be present in the organophilic polyphenolic material will be about 100% by weight, based on the weight of the polymer. Amounts of phosphatide substantially above this 100% by weight may produce a sticky, gummy solid which cannot be easily handled. When utilizing a slurry-type process, the maximum amount of phosphatide will be in the range from about 50% to about 100% by weight, based on the weight of the polymer, depending on the particular characteristics of the polymer and its purity.

When utilizing commercial lecithin as the phosphatide, which contains from about 30% to about 50% by weight of the vegetable oil from which the phosphatide is obtained, there is preferably utilized from about 5% to about 150% commercial lecithin, based on the weight of the moisture free-polymer, most preferably from about 10% to about 50% based on the weight of the moisture free-polymer.

It may be desired to improve the dispersibility or solubility of the organophilic polymers in certain oleaginous liquids by incorporating therein one or more nitrogen-containing organic compounds containing at least one alkyl, alkenyl, or acyl radical having from about 16 to about 30 carbon atoms in a straight chain such as the amines, amine salts, quaternary ammonium compounds, amides, and amide-amines (partial amides) disclosed in the prior art for the modification of the polyphenolic materials. Exemplary of such nitrogen-containing organic compounds are:

(i) fatty ammonium compounds having the empirical formula

where: $R_1$, $R_2$, and $R_3$ are independently selected from the group consisting of H, aliphatic groups containing from 1 to about 30 carbon atoms, and benzyl; $R_4$ is an aliphatic group containing from about 16 to about 30 carbon atoms; and $A^-$ is a charge balancing anion, preferably a halogen, most preferably chloride;

(ii) fatty polyamides or amide-amines which are the reaction products of a fatty acid or fatty acid derivative with an alkylene diamine or polyalkylene polyamine containing up to about 9 amine groups, having the empirical formula

where: $R_1$ is H, $C_{2-6}$ hydroxyalkyl, or an aliphatic group containing from 1 to 30 carbon atoms; $R_2$ is selected from the group consisting of H and $R_3CO$; $R_3$ is an aliphatic group containing from about 15 to about 29 carbon atoms; n is an integer from 2 to 6, preferably 2 or 3; x is 0 or an integer from 1 to about 7; provided that at least one $R_2$ radical is $R_3CO$; and (iii) mixtures thereof.

The preferred amount of the nitrogen-containing organic compound incorporated into the organophilic polymers of this invention is from 0% to about 50% by weight, based on the weight of the polymer, most preferably from about 2% to about 25% by weight.

Additionally, it may be desirable to improve the dispersibility or solubility of the organophilic polyphenolic material of this invention in certain oleaginous liquids by incorporating therein a polyvalent metallic cation compound. Non-limiting illustrative examples of suitable polyvalent cation compounds include calcium oxide, calcium hydroxide, calcium chloride, calcium acetate, calcium bromide, magnesium chloride, magnesium oxide, magnesium hydroxide, magnesium sulfate, ferric chloride, ferrous sulfate, zinc chloride, zinc sulfate, nickelic chloride, chronic chloride, aluminum chloride, aluminum sulfate, and the like. The preferred polyvalent cation compound is selected from the group consisting of calcium oxide, calcium hydroxide, magnesium oxide, magnesium hydroxide, and mixtures thereof, most preferably calcium hydroxide.

The preferred amount of the polyvalent cation compound incorporated into the organophilic polymer of this invention is from 0% to about 15% by weight based on the weight of the moisture-free organophilic polymer material, most preferably from about 2% to about 10%.

In a most preferred embodiment of this invention, there is added to the organophilic polymer of the invention, before drying thereof, a solid diluent in an amount sufficient to improve the handling characteristics of the material. Suitable diluents which may be used, for example and not by way of limitation, are clays such as kaolin, diatomaceous earth, silica, calcium carbonate, ground vegetable by-products such as bagasse and cotton linters, and the like. The preferred diluent is a hydrophobic, organophilic, water wettable fibrous material as disclosed in Cowan et al. U.S. Pat. No. 4,428,843, incorporated herein by reference, most preferably the hydrophobic, organo-philic, water wettable cotton as disclosed in Cowan et al. U.S. Pat. No. 4,404,107, incorporated herein by reference.

The amount of the solid diluent added to the organophilic polymer will generally range from 0% up to about 35% by weight of the moisture-free organophilic polymer, preferably in the range from about 5% to about 25%.

The organophilic polymeric adducts of this invention may be used as fluid loss control additives in oil based well working fluids. They may be used as produced, but preferably after drying and grinding as disclosed hereinbefore. The FLCA are solublized or dispersed in oil base well-working fluids with the normal agitation available where such fluids are prepared, such as at liquid "mud" plants or at the location where the well-working fluid will be used.

The oil which forms a continuous phase of the well-working fluid is a petroleum (mineral) oil, and most generally is an ordinary diesel oil, although it may be rather lighter, such as kerosene, or somewhat heavier, such as fuel oil, white oils, or crude oil, as is well known in the art. In some cases the sole constituents of the well-working fluids may be simply a petroleum oil and the FLCA. The latter may be present from as little as 5 kg/m$^3$ to as high as 150 kh/m$^3$. The beneficial effect on fluid loss of the use of the FLCA may be observed even at the lowest concentration. This is especially the case when the FLCA is added to the well-working fluids containing other additives, of types to be mentioned hereinbelow.

Frequently, the well-working fluids will contain other additives, a common one being water, often present from as little as 2% or 3% by volume to as great as 40% to 60% by volume. It is desirable and common to use a suitable emulsifying agent, which may be the calcium salt of an inexpensive fatty acid, e.g., calcium tallate, to emulsify the water in the oil. An important feature of my invention, however, is that the FLCA are excellent emulsifying agents for any water which may be present in the well-working fluids. It is important that such water be kept in the form of a good stable water-in-oil emulsion.

The presence of water in the well-working fluids serves to increase the density of the fluid somewhat since the water is heavier than the oil used; and it also helps to reduce filtration. Also it lowers the cost of the well-working fluid which is often an important item when large volumes are used. Often water soluble salts such as calcium chloride are added to the aqueous phase.

Weighting materials are routinely used in well-working fluids where needed, such as ground barite, calcium carbonate, siderite, iron oxide, ilmenite and the like. Suspending agents and viscosifiers such as organophilic clays, asphalt, polymers and the like are commonly employed. Moreover, the well-working fluids may contain various oil soluble or dispersible materials which function to keep the solids in the well-working fluid from being wet with water.

Addition of one or more amino compounds to the well-working fluid may advantageously increase the thermal stability and emulsion stability of the well-working fluid.

The following nonlimiting examples illustrate the results and benefits obtainable utilizing the FLCA of this invention in well-working fluids as well as illustrating the preferred method of preparing the FLCA. In the examples, all percentages are by weight unless otherwise indicated. All data were obtained utilizing the American Petroleum Institute's recommended testing procedures as set forth in API RP 13B.

EXAMPLE 1

250 grams of xanthan gum (Kelco XC Polymer) were thoroughly mixed with 35 grams of commercial soybean lecithin. This sample was evaluated for its ability to decrease the fluid loss of Mentor 28 mineral oil by mixing the oil with 31.6 kg/m$^3$ of the sample for 10 minutes with a Multimixer. The API fluid loss at room temperature was 7 cc. This sample was evaluated at a concentration of 28.5 kg/m$^3$ for its effect on the properties of an invert oil emulsion drilling fluid. The data are given in Table 1.

TABLE 1

| Initial Properties | Base Mud | 28.5 kg/m$^3$ Sample No. 1 |
|---|---|---|
| Plastic Viscosity, cp. | 35 | 34 |
| Yield Point, kg/m$^2$ | 13 | 11 |
| 10-Second Gel Strength, kg/m$^2$ | 2 | 2 |
| 5-Minute Gel Strength, kg/m$^2$ | 6 | 2 |
| After Rolling for 16 Hours at 300° F. | | |
| Plastic Viscosity, cp. | 35 | 33 |
| Yield Point, kg/m$^2$ | 12 | 6 |
| 10-Second Gel Strength, kg/m$^2$ | 3 | 2 |
| 5-Minute Gel Strength, kg/m$^2$ | 9 | 4 |
| HT-HP Fluid Loss at 300° F., cm$^3$ | 29 | 16 |

EXAMPLE 2

50 grams of alginic acid were mixed thoroughly with 7 grams of commercial soybean lecithin. This sample was evaluated at a concentration of 28.5 kg/m$^3$ for its effect on the properties of an invert oil emulsion drilling fluid. The data are given in Table 2.

TABLE 2

| Initial Properties | Base Mud | 28.5 kg/m$^3$ Sample No. 2 |
|---|---|---|
| Viscosity, cp. | 30 | 31 |
| Yield Point, kg/m$^2$ | 12 | 14 |
| 10-Second Gel Strength, kg/m$^2$ | 5 | 7 |
| 5-minute Gel Strength, kg/m$^2$ | 9 | 10 |
| Emulsion Stability, v. | 2000+ | 1820 |
| After Rolling for 16 Hours at 300° F. | | |
| Viscosity, cp. | 33 | 42 |
| Yield Point, kg/m$^2$ | 9 | 17 |
| 10-Second Gel Strength, kg/m$^2$ | 6 | 8 |
| 5-Minute Gel Strength, kg/m$^2$ | 13 | 16 |
| Emulsion Stability, v. | 1250 | 1360 |
| HT-HP Fluid Loss at 300° F., cm$^3$ | 21 | 14 |

The organophilic polymer adducts of this invention have utility in other organic liquids other than oil base drilling fluids. Thus they may be useful in printing inks, foundry mold and core sands, foundry mold and core washes, coatings, agricultural sprays, and other systems containing a major proportion of an oleaginous liquid.

What is claimed is:

1. An oil base well working fluid comprising a major proportion of oil and a minor proportion but sufficient to decrease the fluid loss of said fluid of an organophilic polymer comprising an adduct of a water soluble polymer and one or more phosphatides having the empirical formula

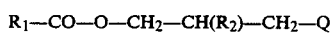

$$R_1-CO-O-CH_2-CH(R_2)-CH_2-Q$$

where: $R_1$ is an aliphatic group containing from 8 to 29 carbon atoms; $R_2$ is selected from the group consisting of H, OH, $R_1COO$, and $OP(O)(O^-zM^{a+})OZ$; Q is selected from the group consisting of $R_1COO$ and $OP(O)(O^-zM^{a+})OZ$; Z is selected from the group consisting of $xM^{a+}$, $C_6H_6(OH)_5$ and $CH_2-CH(Y)-N(R_3)(R_4)(R_5)_y(A^{b-})_v$; Y is selected from the group consisting of H and $COO(xM^{a+})$; $R_3$, $R_4$, and $R_5$ are independently selected from the group consisting of H, aliphatic groups containing from 1 to 30 carbon atoms, and $R_6CO$; $R_6$ is an aliphatic group containing from 1 to 29 carbon atoms; M is a cation selected from the group consisting of H, and alkali metal, an alkaline earth metal, ammonium, and mixtures thereof; A is an anion of valence b; $y=0$ or 1; w, x, and $z=0$ or $1/a$ where a is the valence of M; $v=0$ or $a/b$; and where Q is $R_1COO$ only when $R_2$ is $OP(O)(O^-zM^{a+})OZ$.

2. The oil base well working fluid of claim 1 wherein said water soluble polymer is a cationic or anionic polysaccharide or derivative thereof selected from the group consisting of alginic acid, agar, carrageenan, cellulose, chitin, guar gum, gum arabic, gum ghatti, gum karaya, gum konjak, gum tamarind, gum tara, gum tragacanth, locust bean gum, pectins, starch, xanthan gum, and mixtures thereof.

3. The oil base well working fluid of claim 1 wherein said water soluble polymer is a cationic or anionic polysaccharide which contains one or more monosaccharide units selected from the group consisting of arabinose, fructose, galactose, galactopyranosyl, galacturonic acid, gluronic acid, glucuronic acid, glucose, glucoside, N-acetylflucosamine, mannuronic acid, mannose, pyranosyl sulfate, rhammose, and xylose, or a derivative of said polysaccharide.

4. The oil base well working fluid of claim 1 wherein said water soluble polymer is an anionic or cationic synthetic polymer wherein said anionic polymer is prepared be reacting under polymerizing conditions one or more ethylenically unsaturated acids with one or more ethylenically unsaturated non-ionic monomers, and wherein said cationic polymer is prepared by reacting under polymerizing conditions one or more ethylenically unsaturated amino or ammonium monomers with one or more of said non-ionic ethylenically unsaturated monomers.

5. The oil base well working fluid of claims 1, 2, 3, or 4, wherein said phosphatide is a mixture of phosphatides where:

$R_2 = c\ R_1COO + d\ OP(O)(O^-zM^{a+})(OZ)$;

$Q = d\ R_1COO + c\ OP(O)(O^-zM^{a+})OZ$;

$R_1$ is an aliphatic group containing from about 15 to about 17 carbon atoms;

$R_3$, $R_4$, and $R_5$ are independently selected from the group consisting of H, $CH_3$ and $R_1CO$; and $c \geq 0$, $d \geq 0$, and $c+d=1$.

6. The oil base well working fluid of claims 1, 2, 3, or 4, wherein said phosphatide is a mixture of phosphatides obtained from a vegetable oil.

* * * * *